UNITED STATES PATENT OFFICE.

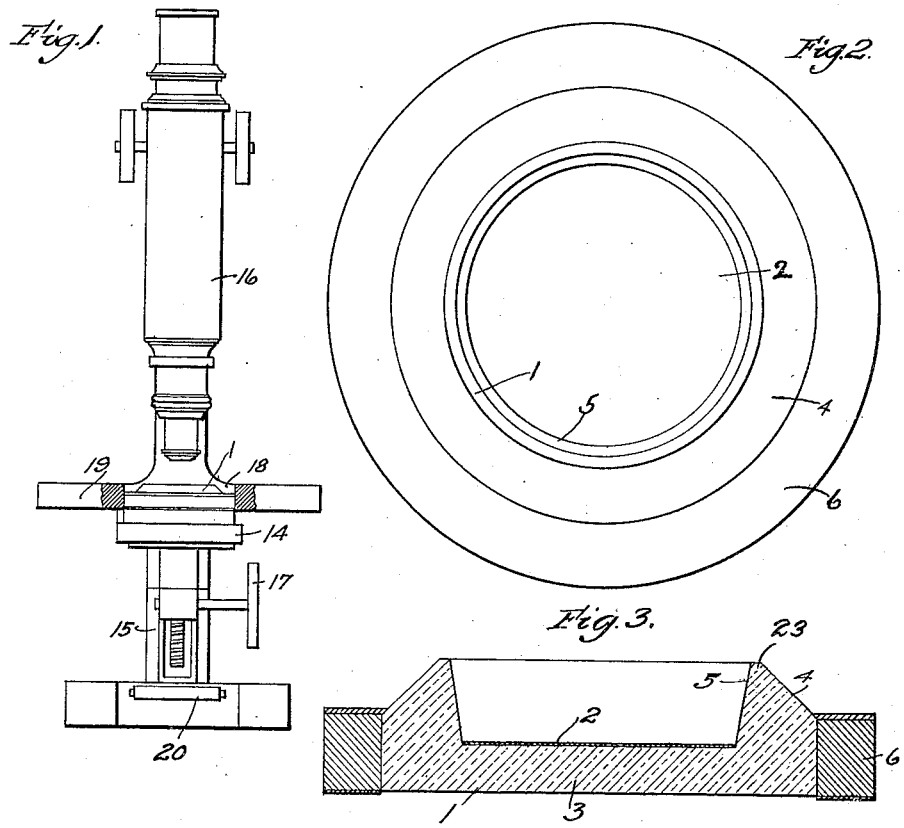
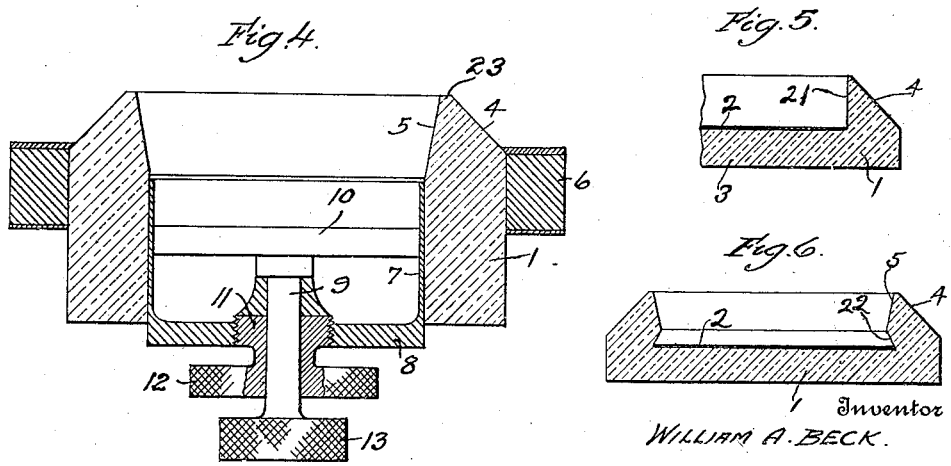

WILLIAM A. BECK, OF DAYTON, OHIO, ASSIGNOR TO ST. MARY COLLEGE, SOCIETY OF MARY, PROVINCE OF CINCINNATI, OF DAYTON, OHIO.

ILLUMINATING DEVICE FOR MICROSCOPES.

1,427,714.   Specification of Letters Patent.   Patented Aug. 29, 1922.

Application filed November 15, 1919. Serial No. 338,320.

*To all whom it may concern:*

Be it known that I, WILLIAM A. BECK, a citizen of the United States, residing at Dayton, in the county of Montgomery and State of Ohio, have invented certain new and useful Improvements in Illuminating Devices for Microscopes, of which the following is a specification, reference being had therein to the accompanying drawing.

This invention relates to an illuminating device for microscopes and the like.

In the use of microscopes, and more particularly in the use of a high power instrument, it is necessary to provide some means for illuminating the object which is being examined. When the object is transparent this may be accomplished by providing a transparent support for the object and reflecting the light through the object from beneath, but when the object is opaque this cannot be done, and much difficulty is experienced in securing a proper illumination. Various devices have been employed in an effort to secure a proper illumination but none, so far as I am informed, has been wholly satisfactory. In some cases there is an interference of light rays and the illumination does not have the proper depth. The mechanical construction of many of these devices is such as to interfere with the vision or with the manipulation of the instrument, or both. Again, some such devices tend to heat the object to an extent that is objectionable. These and other objectionable features of the illuminating devices have greatly increased the difficulties of, and have tended to restrict the field of, microscopical research work. This is especially true of micro-photography, as the requirements as to illumination in this branch of work are more exacting than in any other.

One object of the present invention is to provide a device which will illuminate the object which is under examination uniformly and with the desired degree of intensity.

Another object of the invention is to provide a device of this kind which will offer no obstruction, either mechanical or optical, to the vision, and which will not interfere with the manipulation of the instrument. It is also an object of the invention to provide a device of this kind in which the shadows may be controlled at will.

A further object of the invention is to provide such a device which will be simple in construction and which can be easily applied to the instrument.

Other objects of the invention will appear as the device is described in detail.

In the accompanying drawings Fig. 1 is a front elevation, partly broken away, of a microscope showing my invention applied thereto; Fig. 2 is a plan view of my illuminating device; Fig. 3 is a transverse sectional view taken centrally through such a device; Fig. 4 is a transverse sectional view taken centrally through a slightly modified form of my invention; Fig. 5 is a sectional view of a portion of a slightly modified form of the invention; and Fig. 6 is a sectional view of another modified form of the invention.

In these drawings I have illustrated one embodiment of my invention, with certain modifications thereof, and have shown the same as comprising a structure mounted adjacent to and extending above the edge of a stage, or table, upon which the object to be examined is supported. This structure is of such a character that it will receive light from below, and that portion of the structure arranged above the level of the stage is provided with a reflecting surface which will direct the rays of light toward the stage. Preferably, the structure is of glass and is circular in form so that the light will be directed onto the stage from all sides thereof. It will be understood, however, that this particular embodiment of the invention has been shown for the purpose of illustration only, and that the structure may take various forms and may be made in sections, either segmental or otherwise, one or more of which may be used as may be desired.

In all forms of the invention here shown the illuminating device comprises a body portion, or medium, 1, which is preferably of glass and is circular in form. This body portion, or medium, is provided with a central depression, or well, the bottom of which, as shown at 2, constitutes a stage, or support, for the object to be examined. As shown in Figures 2 and 3, that part of the structure comprising the stage is formed integral with the circular body portion, or medium, as shown at 3, but this is not essential to the proper operation of the device, as will hereinafter appear. That portion of the medium which extends above the level of the stage 2 has its outer surface beveled, or inclined, as shown at 4, so that rays of light entering the medium from beneath will be reflected toward the opposite, or inner, surface of the same, and this inner surface is also preferably inclined, as shown at 5, so that it will refract the rays of light toward the stage. Consequently, the medium will cause a plurality of substantially parallel rays of light to be directed onto the stage in approximately horizontal lines, and where the device is circular, as here shown, these rays will be directed onto the stage, and, therefore, onto the object, from all sides. In order to obtain total reflection, the outer surface should be at an angle of forty-five degrees to that surface of the medium through which the light enters, which in the present instance is the lower surface. The inner surface may be at various angles according to the refraction desired. The outer surface 4 of the medium may be treated in any suitable manner to secure the desired degree of reflection. Very satisfactory results may be had by polishing this surface, but I prefer to coat the same with some opaque substance, such as silver, in order that a maximum efficiency may be had. The stage 2 is opaque, and in that form of the device shown in Figures 2 and 3 the central portion 3 of the structure is provided on its upper surface with a coating of opaque material, such as a composition of litharge and glycerin. The central portion 3 of the structure 1 has its surface ground to prevent the passage of light rays. The outer vertical surface of the medium is surrounded by a supporting structure, 6, which prevents the entrance of light through this surface. Consequently, light can enter the medium only from below. The medium may be made from glass of any suitable kind, either ordinary glass or optical glass, but the detailed construction of the device, and more particularly the angular relation of the inclined surfaces 4 and 5 will vary more or less according to the character of the glass employed and the diameter of the well, because, in order to have the maximum of illumination, the angle should be computed with regard to the index of refraction of the glass. In the particular structure here shown I have used optical crown glass with an index of refraction of 1.52 and the outer surface 4 is formed at 135° from the horizontal, and the inner surface 5 is formed at 99° and 20′ from the horizontal. The diameter of the well at its base, that is, the diameter of the stage, is 1.8 c. m., and the external diameter of the medium is 3 c. m. These dimensions may be varied more or less without materially affecting the operation of the device, but very satisfactory results have been secured with a device constructed with the dimensions given.

Preferably the upper edges of the inclined surfaces do not meet but the medium terminates in a flat upper surface 23. This feature of construction does not affect the illumination but greatly reduces the liability of the glass cracking either in the course of manufacture or in use.

It is not necessary that the stage 2 should be fixed with relation to the medium, although there is one position of the stage with relation to a medium of given dimensions which will give the most satisfactory results. In Fig. 4 I have shown an illuminating device in which the stage is vertically adjustable to enable bodies of considerable thickness to be supported thereon for examination with the parts which are to be examined in proper relation to the angular surfaces of the medium, so that a satisfactory illumination may be had. This may be accomplished in various ways, but, as here shown, the medium is in the form of a ring, and has mounted therein a shell, or bushing, 7, having a bottom wall 8, in which is adjustably mounted a stem 9 carrying at its upper end a table, or stage, 10. In the present construction I have provided means for vertically adjusting this stage and for rotating the same without affecting the vertical adjustment. To accomplish this, the stem 9 is rotatably mounted in a plug, or bushing, 11, which is screw threaded into an opening in the bottom 8 of the shell 7. The bushing 11 has a knurled head 12, by means of which it may be rotated, and the stem is provided with a like head 13. It will be apparent that with this construction the stage may be vertically adjusted by rotating the screw threaded bushing 11, and that after this adjustment has been effected the stage may be rotated without changing the vertical adjustment, to bring different parts of the object under examination into line with the objective of the microscope.

The illuminating device may be mounted on a microscope in any suitable manner, but I prefer to so mount it that it may be moved into a position flush with the top of the main stage, or supporting table, of the microscope. To this end, the present device has been made interchangeable with the Abbe condenser, which is standard equipment on many high power microscopes. The condenser is carried by a supporting structure 14, which is slidably mounted upon the base 15 of the microscope 16, and is adjustable thereon by means of a wheel 17. When the supporting structure, or band, 14, is in its lower position, the illuminating device is mounted therein and is then moved upward into an opening 18 in the main stage 19 of the microscope. It will be apparent that when the device is in this position that it offers no obstruction of any kind whatever, either mechanical or optical, to the vision or to the manipulation of the instrument.

The light may be directed to the lower surface of the medium in any suitable manner, but in the present instance I have utilized the usual reflector, or mirror, 20, which is mounted on the base of the instrument and is adjustable with relation to the illuminating device. The intensity of the illumination may be varied, either by variation in the intensity of the light at its source, or by variation of the position of the reflecting mirror. The maximum intensity is obtained when the rays are strictly parallel and the light is well centered and the pencil of rays of sufficient diameter to cover the entire medium. By varying the position of the mirror so as to make the light eccentric, practically any effect of illumination can be obtained to suit the needs of the observer, and shadows which are cast by the object itself may be controlled to suit the needs of the particular work in hand, or may be eliminated altogether. If the observer desires to work in a particular color or light it is only necessary to interpose the usual color screen, or diagram, between the mirror and the illuminating device.

Under certain conditions it is desirable to work in a greater diffusion of light than can be had with the medium shown in Fig. 3. A diffused light of a very satisfactory character can be secured by slight changes in the shape of the medium. In Fig. 5 of the drawing I have shown the inner surface 21 of the upper portion of the medium substantially vertical, and if this surface is left unpolished, the light which is reflected to it, will not be refracted onto the stage but will be diffused over the stage, thus flooding the object with light.

Under other conditions of work a light of greater intensity is desirable, and this may be had by forming the lower portion of the inner surface of the medium at an angle to the upper portion thereof, as shown in Fig. 6. This lower portion of the inner surface may take various angles with relation to the upper portion of that surface, but as here shown I have undercut the inner surface of the medium near the stage, that is, I have bevelled the same in a reverse direction as shown at 22. The upper and lower portions of this inner surface are arranged at such an angle one to the other, that the light from the upper portion of the surface will be refracted across the stage to the lower portion of the surface, from which it will be reflected on to the object with increased intensity.

This method of illumination has greatly extended the field of research because of the superior character of the illumination, and it permits a satisfactory examination of objects, with high power lenses, which heretofore has been either exceedingly difficult, or altogether impossible. It is particularly valuable in micro-photography because both a uniform and intense illumination may be had, which enables photographs of a most satisfactory kind to be made. The object is illuminated for its full depth and all parts of it may be satisfactorily examined or photographed, within the scope of the lens. It provides a uniform field of light with no haze in the vision, and overcomes the glare produced by numerous points of light on the object. There is no light interference, and the illumination is practically perfect. All the light rays stream in laterally along approximately horizontal lines, and there is no obstruction in the line of vision, either mechanical or optical. The diffusion of light in the well also permits the observer to adjust the microscope and position of the object so as to work in diffused light only, which is particularly valuable when one desires to sacrifice contrast for detail. The term "approximately horizontal" is used herein as a convenient description of the positions of the rays of light, which extend at very acute angles to the horizontal. The device may be made to direct the rays in a true horizontal position, but, as here shown, they are at an angle of about 9° from the horizontal and, hence, are characterized as approximately horizontal.

The device comprises no apparatus or accessories in proximity to the microscope to limit or interfere with its manipulation. There is no heat to affect the operation or the object. Further, the device is exceedingly simple, comprising a minimum number of parts, consisting as it does, of a single integral unit which combines within itself both the stage and the illuminator. Further, the construction of the device with its central well provides a most convenient receptacle for liquids under examination. Further, I prefer that the top of the device should be flattened, that is, that the inclined surfaces 4 and 5 should not meet. By so constructing the device the manufacture of the same is facilitated and the liability of the glass to check or crack is very much reduced.

While I have illustrated certain embodiments of my invention, I wish it to be understood that I do not desire to be limited to the details thereof, as various modifications may occur to a person skilled in the art.

Having now fully described my invention, what I claim as new and desire to secure by Letters Patent, is:

1. An illuminating device of the character described, comprising a light transmitting medium to be arranged alongside of the object under examination, and having a portion adapted to project above the plane of said object, said portion having its outer surface inclined to reflect the light toward the inner surface thereof, and having said inner surface inclined to refract the light toward said object.

2. An illuminating device of the character described, comprising a light transmitting medium arranged alongside of the object under examination, and having a portion to project above said object, said portion having its outer surface inclined to reflect the light toward the inner surface, and having said inner surface arranged to direct the rays of light toward said object, said portion of said medium also having a transverse surface at the upper end thereof.

3. An illuminating device of the character described, comprising a light transmitting medium to be arranged alongside of the object under examination, and having a portion to project above said object, said medium being adapted to receive light through the bottom thereof and having the outer surface of the upper portion thereof beveled to reflect the light toward the inner surface of said portion, and having said inner surface beveled to refract the light onto said object.

4. An illuminating device of the character described, comprising a stage, a light transmitting medium at one edge of said stage having a portion projecting above the plane thereof, the upper portion of said medium having its outer surface inclined and having its inner surface arranged at such an angle to said outer surface that a ray of light entering said medium from below will be reflected by said outer surface toward said inner surface and directed by said inner surface onto said stage.

5. An illuminating device of the character described, comprising a stage, a light transmitting medium at one edge of said stage having a portion projecting above the plane thereof, the upper portion of said medium having its outer surface inclined and having its inner surface arranged at such an angle to said outer surface that a ray of light entering said medium from below will be reflected by said outer surface toward said inner surface and directed by said inner surface onto said stage, and means for vertically adjusting said stage relatively to said medium.

6. An illuminating device of the character described, comprising an annular light transmitting medium, to surround the object under examination, and projecting above the plane thereof, the outer surface of the upper portion of said medium being inclined to reflect the light toward the inner surface thereof and said inner surface being inclined to refract the light toward said object.

7. An illuminating device of the character described, comprising an annular light transmitting medium adapted to receive light from below, a stage arranged within said medium, said medium having a portion projecting above said stage, the outer surface of said upper portion of said medium being beveled to reflect the light toward the inner surface of said portion of said medium, and said inner surface being so arranged with relation to said outer surface that it will direct the light onto said stage.

8. An illuminating device comprising a light transmitting medium having a central recess therein, the bottom of which comprises a stage, that portion of said medium which projects above said stage having its outer surface beveled to reflect the light toward the inner surface thereof and having said inner surface so arranged with relation to said outer surface that it will direct the light onto said stage.

9. An illuminating device of the character described, comprising a one piece structure of light transmitting material having a central recess, the bottom of said recess being coated with an opaque substance and that portion of said structure constituting the side walls of said recess being adapted to receive light from below and having its outer surface beveled to reflect the light inwardly and having its inner surface so arranged with relation to its outer surface that it will direct the light onto said stage.

10. An illuminating device of the character described, comprising an annular light transmitting device having a central recess in the upper portion thereof, the bottom wall of said recess being formed integral with said medium and having its upper surface coated with an opaque substance and its lower surface ground, that portion of said medium which projects above the bottom of said recess having its outer surface beveled to reflect the light inwardly and having its inner surface arranged to direct the light toward the bottom of said recess, and means to prevent light from entering said medium between the lower edge of the outer beveled surface thereof and the bottom of said medium.

11. An illuminating device of the character described, comprising a circular light transmitting medium, a stage mounted within said medium, means for adjusting said stage vertically relatively to said medium, said medium having a portion projecting above said stage, having its outer surface inclined, and having its inner surface at such an angle to the inclined outer surface that a ray of light entering said medium from beneath will be reflected by said outer surface toward said inner surface and directed by said inner surface onto said stage.

12. An illuminating device of the character described, comprising a circular light transmitting medium having a central opening therethrough, a supporting structure carried by said medium, a stage mounted within said medium, a device adjustably mounted on said supporting structure and connected with said stage to adjust the same vertically relatively to said medium, and means for rotating said stage relatively to said adjusting device.

13. An illuminating device of the character described, comprising an annular light transmitting medium to surround the object under examination and having a portion adapted to project above said object, said portion having its outer surface inclined to reflect the light toward the inner surface thereof and having the upper and lower portions of its inner surface arranged at an angle one to the other.

14. The combination with a microscope comprising a supporting structure having an opening therein, an illuminating device comprising a light transmitting medium adapted to be mounted within said opening to receive the light from below, a stage arranged within said medium to support the object to be examined, said medium having a portion extending above said stage and said portion having its outer surface inclined to reflect the light toward the inner surface thereof and having said inner surface arranged to refract the light toward said object.

In testimony whereof, I affix my signature hereto.

WILLIAM A. BECK.